3,676,232
PREPARATION OF UNIFORM AND STORABLE
FUEL MIXTURES
James M. Lucas, El Dorado Hills, Calif., assignor to
Aerojet-General Corporation, El Monte, Calif.
No Drawing. Original application Jan. 12, 1968, Ser. No.
698,660, now Patent No. 3,607,470, dated Sept. 21,
1971. Divided and this application Feb. 7, 1969, Ser.
No. 810,446
Int. Cl. C06b 19/02
U.S. Cl. 149—6
1 Claim

ABSTRACT OF THE DISCLOSURE

This patent describes a thixotropic, storage and mechanically stable, gelled liquid rocket fuel comprising hydrazine fuel containing therein a suspension of a polysemicarbazide coated aluminum hydride, and the method for the preparation of the same.

BACKGROUND OF THE INVENTION

This is a division of application Ser. No. 698,660, filed Jan. 12, 1968.

When a fuel composed of hydrazine and aluminum hydride is used in conjunction with nitrogen tetroxide, the theoretical impulse is substantially greater (about 39%) than is the system in which the aluminum hydride is omitted. This performance increase is particularly attractive for propellants to be used in tactical weapons. The advantages of aluminum hydride over other high energy fuels such as beryllium hydride are the absence of toxic exhaust products and lower cost. However, heretofore, major difficulties have been encountered with hydrazine fuels containing aluminum hydride due to the evolution of gas during storage. The evolution of gas is apparently caused by the catalytic decomposition of hydrazine on the surface of the aluminum hydride. To overcome the gas evolution problem, it has been proposed to coat the aluminum hydride with various polymeric coating materials. In another aspect of the problem, it has been long recognized that in order to avoid sloshing and minimize the hazards of spills and the like, a liquid rocket propellant should be in the form of a mechanically stable thixotropic gel. The gellation of hydrazine containing aluminum hydride has been accomplished using a number of different commercially available gelling agents. However, most of these gelling agents are not satisfactory because they are easily shear thinned and have a long recovery time.

The present invention is based upon the surprising discovery that a poly [(alkyl or aryl)-(alkyl or aryl) semicarbazide] copolymer coating on aluminum hydride eliminates the gas evolution problem and causes gelling of the hydrazine fuel to eliminate the need for additional gelling agents. The present invention provides the only known aluminum hydride-hydrazine fuel system in which the coating used to eliminate gas evolution also produces a thixotropic gel.

SUMMARY OF THE INVENTION

Briefly, the present invention comprises a novel thixotropic, mechanically stable, gelled liquid fuel composition comprising hydrazine fuel containing uniformly distributed therein aluminum hydride coated with a poly [(alkyl or aryl)-(alkyl or aryl) semicarbazide] copolymer. It has been found that the gelled fuels of the present invention provide a storable propellant system. In other words, the aluminum hydride does not tend to settle in the bottom nor does it tend to generate gas from the hydrazine fuel.

It is an object of this invention to prepare a novel gelled liquid rocket fuel.

More particularly, it is an object of this invention to provide a fuel containing aluminum hydride in which a single agent causes gelling and reduces gas evolution.

These and other objects and advantages of this invention will be apparent from the detailed description which follows.

DESCRIPTION OF PREFERRED EMBODIMENTS

In general, the novel gelled fuel of the present invention is prepared by adding an inert solvent containing alkyl or aryl dihydrazine to aluminum hydride to form a slurry. An aryl or alkyl diisocyanate dissolved in an inert solvent is added to the agitated slurry. After completion of the reaction, the mixture is separated by filtration. The solid product is washed with fresh solvent and dried. The coated aluminum hydride is then mixed with a hydrazine fuel and a uniform stable thixotropic suspension is formed. The addition of the dihydrazine and the diisocyanate is normally carried out at ambient temperatures.

The chemical reaction involved in the formation of the poly [(alkyl or aryl)-(alkyl or aryl) semicarbazide] copolymer is as follows:

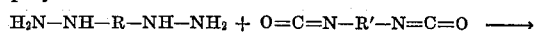

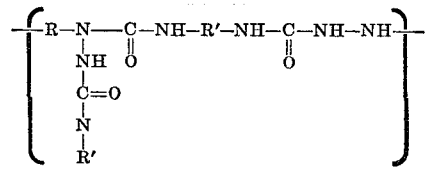

and

wherein R and R' represent alkyl or aryl groups. Usually, these groups contain from 1 to about 12 carbon atoms.

Preferably, although not necessarily, the polymers are prepared by reacting the dihydrazine and diisocyanate in a one to one mole ratio. For optimum results, the weight ratio of coated aluminum hydride to hydrazine fuel approximates one to one. The minimum weight ratio of the polymer coating to the aluminum hydride is normally about 1 to 20. In general, the proportions and ratios referred to are not critical to this invention. The optimum values vary with the particular type of aluminum hydride and polymeric coating used. For any given system, those skilled in the art will be able to optimize the ratios and proportions by performing a few simple tests to establish good gelling and low gas evolution. As a general proposition, the polymeric coating and aluminum hydride are present in effective gelling and gas evolution-controlling amounts.

Typical dihydrazines and diisocyanates used in this invention include ethylene dihydrazine, phenylene dihydrazine, hexamethylene diisocyanate, and phenylene diisocyanate.

The following examples are presented solely to illustrate the invention and should not be regarded as limiting in any way. In the examples, the parts and percentages are by weight unless otherwise indicated.

Example I

Ethylene dihydrazine (2 millimoles) was mixed with 50 ml. of diethyl ether and this dispersion was added to 10 grams of aluminum hydride in a flask equipped with a stirrer, condenser, addition funnel, and inert gas inlet. The additions and reactions were conducted under an atmosphere of nitrogen. Hexamethylene diisocyanate (2 millimoles) was dissolved in 25 ml. of diethyl ether and this solution was added drop-wise to the stirred slurry of aluminum hydride, ethylene dihydrazine, and diethyl ether. The mixture was stirred for three hours at room temperature after the additions were completed. The mixture was filtered; the solid residue was washed twice with 10 ml. of diethyl ether and then dried at room temperature to a constant weight.

Example II

The dried product of Example I was added to an anhydrous hydrazine to form a mixture of 50.2 weight percent hydrazine and 49.8 weight percent coated aluminum hydride. After stirring for one-half hour, a smooth uniform, thixotropic suspension was performed. The density of this suspension was 1.18 grams per ml. and the viscosity at a shear rate of 17,300 sec.$^{-1}$ was 24.0 cp. This moisture was chemically and mechanically stable for 93 days at which time the experiment was terminated.

TABLE I.—THE EFFECT OF POLYMERIC COATINGS ON ALUMINUM HYDRIDE IN HYDRAZINE ON THE PRESSURE RISE RATE

| Example No. | Polymeric coating, wt. percent total mix | Particle size AlH$_3$, microns | AlH$_3$ loading, percent |
|---|---|---|---|
| 3 | 10.9% polymer of Example 1 | 3 | 22 |
| 4 | None | 3 | 50 |
| 5 | 1.7% polymer of Example 1 | 4 | 34 |
| 6 | None | 4 | 39 |
| 7 | 2.8% polymer of Example 1 | 11 | 49 |

| Example No. | Pressure rise rate, mm. Hg/day after weeks— | | | |
|---|---|---|---|---|
|  | 1 | 2 | 3 | 4 |
| 3 | 24 | 16 | ($^1$) |  |
| 4 |  | ($^1$) |  |  |
| 5 | 56 | 15 |  | 4 |
| 6 |  | ($^1$) |  |  |
| 7 | 32 | 20 |  | 19 |

| Example No. | Polymeric coating, wt. percent total mix | Particle size AlH$_3$, microns | AlH$_3$ loading, percent | Remarks |
|---|---|---|---|---|
| 8 | 2.2% polymer of Example 1. | 8 | 47 | Gel thixotropic, stable for 95 days. |
| 9 | 9.4% polymer of Example 1. | 5 | 43 | Stable gel, yield stress-2,700 dynes/cm.$^2$, Brookfield viscosity at 6 r.p.m.-11.2 cp. |

$^1$ Too fast to measure.

The data in the foregoing tables clearly show the effectiveness of the coated aluminum hydride in hydrazine.

While not bound by any theory, it is believed that the polymerization of ethylene dihydrazine and hexamethylene diisocyanate forms either or both poly (1-ethylene-4-hexamethylene semicarbazide) and poly (2-ethylene-4-hexamethylene semi-carbazide). If the latter polymer predominates, excess hexamethylene diisocyanate tends to condense with the free primary amine to give a branched chain polymer. This branched chain polymer if held to the surface of an aluminum hydride particle by chelate bond, contains the hydrazine solvophylic groups, that may suspend the aluminum hydride particles in hydrazine similar to a dispersion of particles in an oil-water emulsion. The suspension of aluminum hydride coated by the branched chain polymer in hydrazine is suggested as the probable mechanism since a stable gel is not obtained when ethylene dihydrazine is replaced by either hydrazine or 1,4-diamino-2-methyl-piperazine. Apparently, because a solvophylic polymer like the branched chain polymer will not form in either case. It has also been found that a more stable gel is formed as the mole ratio of hexamethylene diisocyanate to ethylene dihydrazine is increased, one to one mole ratio being the minimum ratio with this polymer coating at 5 weight percent on aluminum hydride. The above postulated mechanism is also supported by the observation that hydrazine and the branched chain polymer without any aluminum hydride form a 2-phase liquid-solid system which was not uniformly dispersed. Likewise, hydrazine and elemental aluminum coated with the branched chain polymer formed a similar non-uniform dispersion, apparently due to the fact that the branched chain polymer was unable to chelate with aluminum or hydrazine to effect a cross-linked polymer chain structure. Similar results are obtained with polymers from propylene dihydrazine and phenylene diisocyanate.

As will be apparent in the foregoing, the unique polymer coated aluminum hydride of the present invention represents a major breakthrough in the field of liquid rocket propellants. This system provides a fuel which is feasible for handling in the available liquid rocket engines while minimizing the hazards previously associated with these materials. The problem of gas evolution and lack of a mechanically stable gel have been overcome.

Having fully described the invention, it is intended that it be limited only by the lawful scope of the appended claim.

I claim:
1. Aluminum hydride coated with the reaction product of an arylene or alkylene dihydrazine with an arylene or alkylene diisocyanate.

References Cited

UNITED STATES PATENTS

| 3,377,308 | 4/1968 | Oertel et al. | 260—32.6 |
| 3,463,794 | 8/1969 | Slagel | 260—396 |
| 3,355,491 | 11/1967 | Niles et al. | 260—564 |
| 3,373,062 | 3/1968 | Morris | 149—6 |
| 3,377,955 | 4/1968 | Hodgson | 149—6 X |
| 3,440,115 | 4/1969 | Falterman et al. | 149—4 |

BENJAMIN R. PADGETT, Primary Examiner

E. A. MILLER, Assistant Examiner

U.S. Cl. X.R.

117—100 B, 161 KP; 149—36; 260—77.5 CH